Figure 1:
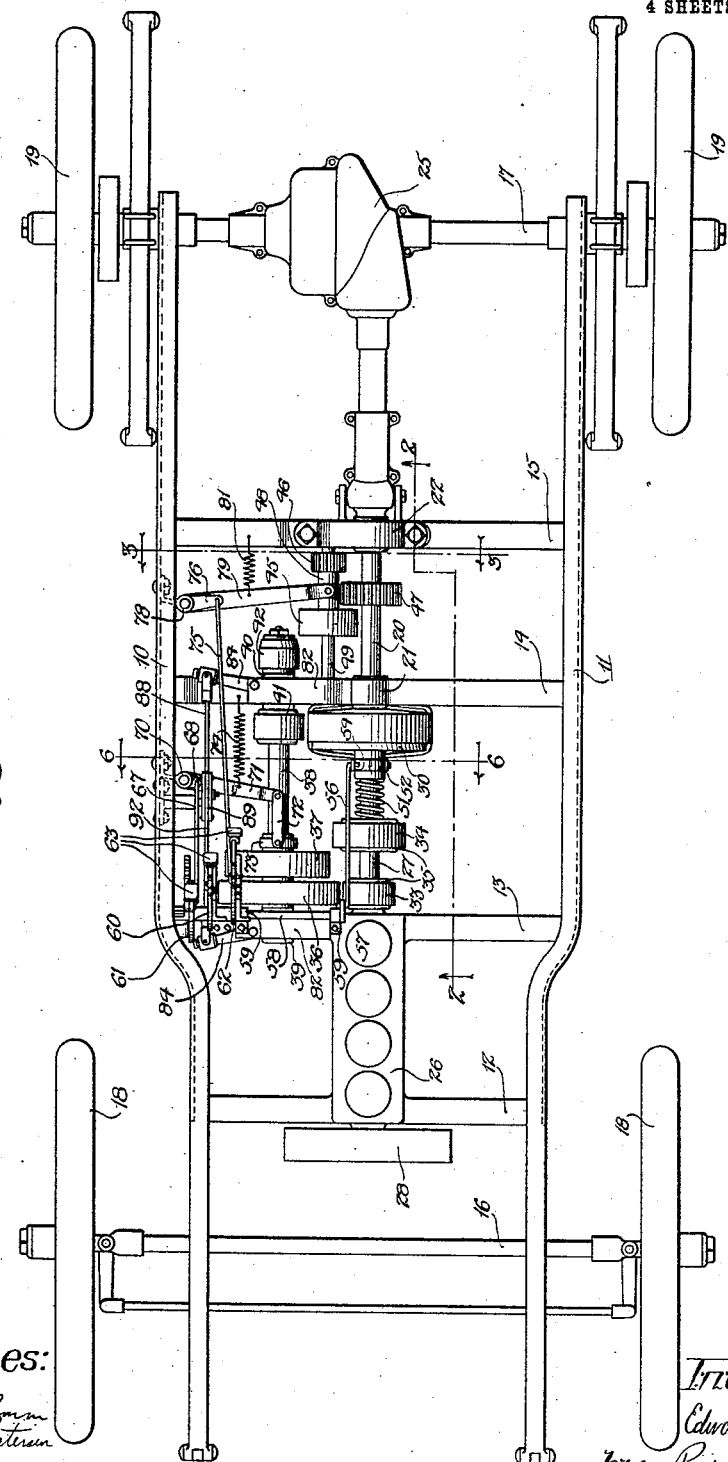

E. M. HEYLMAN.
VEHICLE DRIVING MECHANISM.
APPLICATION FILED NOV. 8, 1909.

1,070,890.

Patented Aug. 19, 1913.
4 SHEETS—SHEET 1.

Witnesses:

Inventor:
Edward M. Heylman,
by Pierce & Fisher
Attys.

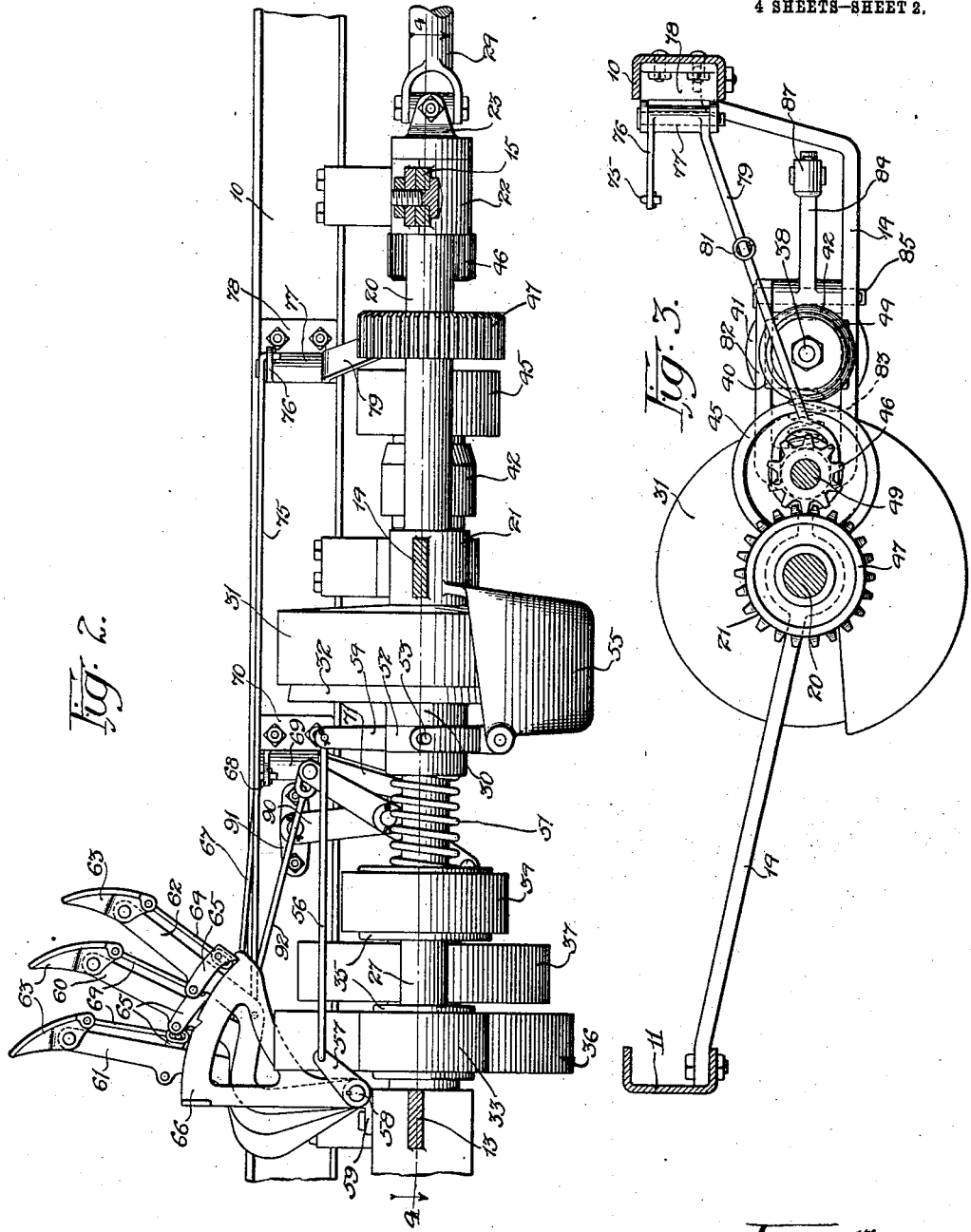

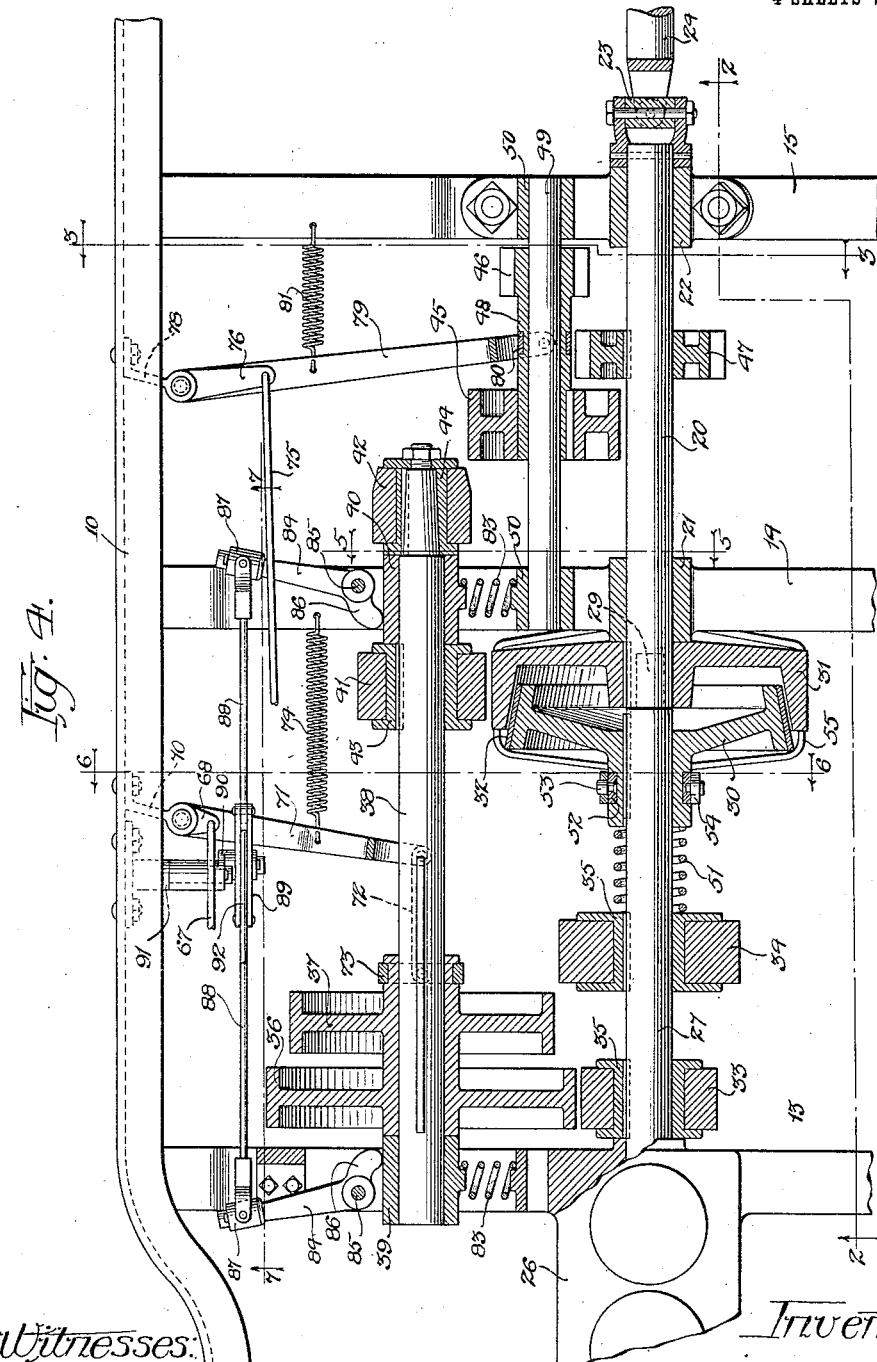

E. M. HEYLMAN.
VEHICLE DRIVING MECHANISM.
APPLICATION FILED NOV. 8, 1909.
1,070,890.
Patented Aug. 19, 1913.
4 SHEETS—SHEET 4.
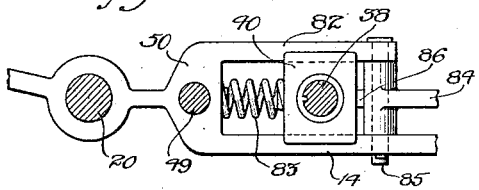
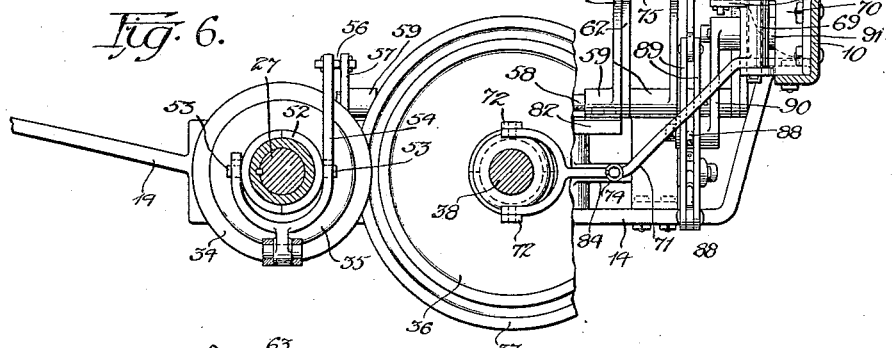
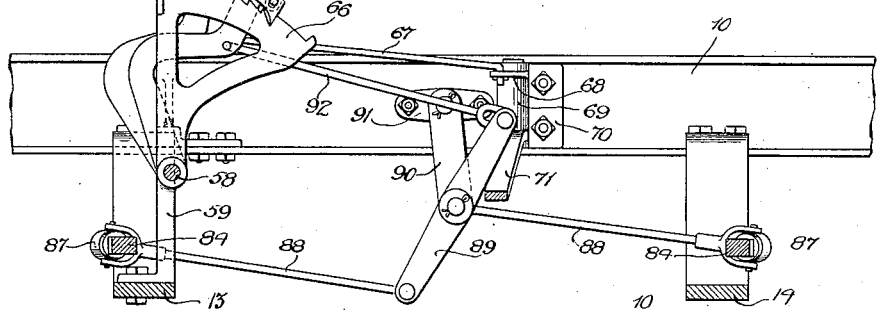
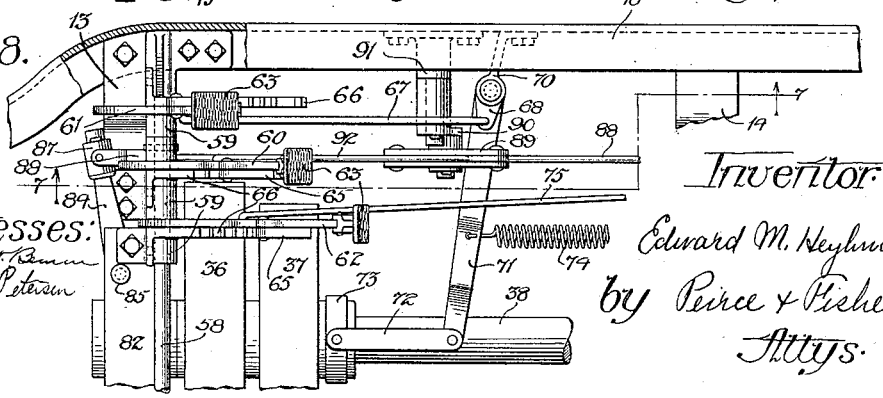
Witnesses:
Frank W. Benson
Hildur E. Petersen
Inventor:
Edward M. Heylman
by Peirce & Fisher
Attys.

UNITED STATES PATENT OFFICE.

EDWARD M. HEYLMAN, OF JANESVILLE, WISCONSIN.

VEHICLE DRIVING MECHANISM.

1,070,890.   Specification of Letters Patent.   Patented Aug. 19, 1913.

Application filed November 8, 1909. Serial No. 526,871.

*To all whom it may concern:*

Be it known that I, EDWARD M. HEYLMAN, a citizen of the United States, and a resident of Janesville, county of Rock, State of Wisconsin, have invented certain new and useful Improvements in Vehicle Driving Mechanisms, of which the following is a specification.

The invention seeks to provide improved drive mechanism for automobiles or other power driven vehicles, which is simple and effective in construction, and which can be readily controlled to vary the speed and reverse the direction of travel of the machine.

The invention also seeks to provide improved transmission mechanism by which the motor shaft can be directly connected to the drive shaft for the traction wheels, or to the axle thereof for driving the automobile ahead at high speed and by which speed reducing and reversing frictional gearing can be employed to connect the motor shaft and drive shaft for propelling the machine ahead or rearwardly at low speed.

With these and other objects in view, the invention consists in the features of improvement hereinafter set forth, illustrated in the preferred form in the accompanying drawings and more particularly pointed out in the appended claims.

In the drawings Figure 1 is a plan view of the automobile frame or chassis with the improved drive mechanism applied thereto. Fig. 2 is a view in elevation on an enlarged scale of the drive mechanism with parts shown in section on the lines 2—2 of Figs. 1 and 4. Fig. 3 is an end view with parts in section on the lines 3—3 of Figs. 1 and 4. Fig. 4 is a plan section of the drive mechanism on the line 4—4 of Fig. 2. Fig. 5 is a detail section on the line 5—5 of Fig. 4. Fig. 6 is a detail section on the lines 6—6 of Figs. 1 and 4. Fig. 7 is a view in elevation of part of the controlling mechanism with parts shown in section on the lines 7—7 of Figs. 4 and 8. Fig. 8 is a plan view on an enlarged scale of the controlling shift levers and adjacent parts.

The automobile frame shown comprises side bars 10 and 11 which are connected by a series of cross bars 12, 13, 14 and 15 arranged at intervals. At its ends the frame is spring-supported from the front and rear axles 16 and 17. The front axle is provided with the usual steering wheels 18 and the rear axle with the usual traction wheels 19.

The drive shaft 20 for the traction wheels extends longitudinally of the frame or at right angles to the axle 17 of the traction wheels. This shaft is arranged midway between the side bars 10 and 11 and is journaled in suitable bearings 21 and 22 on the cross bars 14 and 15, (see Figs. 1, 2 and 4). At its rear end the shaft is connected by a universal coupling or knuckle 23 to the forward end of the transmission shaft 24. The rear end of this transmission shaft is connected to the rear axle 17 by any suitable arrangement of beveled and compensating gearing arranged within a gear case 25 on the rear axle.

The engine or motor 26 is mounted upon the front cross bars 12 and 13 with its crank or motor shaft 27 in line with the drive shaft 20. The motor shaft 27 is journaled in suitable bearings in the engine frame and is provided at its forward end with a fly-wheel 28. At its rear end it is provided with a reduced portion 29 which is journaled in a seat in the forward end of the drive shaft 20. A suitable clutch is provided for directly connecting the motor shaft and drive shaft, so that the drive shaft will rotate in unison with the motor shaft and the latter will be directly connected to the rear axle and traction wheels to propel the vehicle ahead at high speed. Speed reducing and reversing gearing are provided for connecting the motor shaft and drive shaft independently of the clutch, and the clutch and speed reducing and reversing gearing are arranged to be alternately thrown into and out of operation by suitable controlling mechanism.

In the preferred form shown, a conical friction clutch member 30 is keyed upon the rear end of the motor shaft 27 to rotate therewith. The clutch member is longitudinally shiftable on the shaft and is adapted to extend within and frictionally engage a conical socket formed in a friction wheel or clutch disk 31 that is fixed upon the forward end of the drive shaft 20 in front of the bearing 21. The shiftable clutch member 30 is provided with a facing 32 of leather or other suitable friction material.

In front of the clutch, the motor shaft 27 is provided with a pair of friction pinions 33 and 34 formed of leather or other suitable friction material mounted on hubs 35 which are keyed to the motor shaft. These friction pinions are of different diameters and coöperate respectively with a pair of friction gears or wheels 36 and 37 which are provided with a common hub and are mounted to slide longitudinally upon a counter shaft 38. The counter shaft is arranged parallel with the motor shaft and drive shaft and is journaled at its ends in bearing boxes 39 and 40, which are slidably mounted on the cross bars 13 and 14. Adjacent its rear end and on opposite sides of the bearing 40, the counter shaft is provided with two friction wheels 41 and 42, which are formed of leather or other suitable friction material mounted on hubs 43 and 44 that are keyed to the counter shaft. The friction wheel 41 is arranged to engage with the exterior surface of the friction wheel or clutch disk 31 upon the forward end of the drive shaft 20. The friction pinion 42 is arranged to coöperate with suitable reversing gearing comprising a friction wheel or gear 45, a toothed pinion 46 and a toothed gear 47 keyed on the drive shaft. The wheel 45 and gear 46 are fixed to the opposite ends of a sleeve 48 which is rotatably and longitudinally shiftable upon a shaft 49 fixed at its ends in sockets 50 formed on the cross bars 14 and 15.

The friction gears or wheels 36 and 37 are keyed to the counter shaft 38, but are longitudinally shiftable thereon to bring either one or the other of these wheels into line with its companion wheel upon the motor shaft 27. If the clutch member 30 is disengaged and the counter saft 38 moved transversely, one or the other of the wheels 36 or 37 thereon will engage its companion wheel 33 or 34 on the motor shaft, and the friction pinion 41 on the counter shaft will engage the friction wheel 31 on the drive shaft. The machine will then be driven ahead at slow speed if the wheel 36 is in line with the wheel 33, and at intermediate speed if the wheels 34 and 37 are in line. By first shifting the sleeve 48 to move the friction wheel 45 into engagement with the friction pinion 42 and the gears 46 and 47 into mesh, the vehicle is driven rearwardly either at slow or intermediate speed. In this position of the reversing gearing the friction wheels 41 and 31 are held out of contact.

The shiftable clutch member 30 on the motor shaft 27 is normally held in engagement with the friction wheel 31 on the drive shaft by a spring 51, which is coiled about the shaft and interposed between the hubs of the clutch member and the friction wheel 34. A ring 52 engages a groove in the hub of the shiftable clutch member and pintles 53 on the ring pivotally engage the parts of a forked arm 54. This arm is pivoted at its lower end upon a segmental casing 55 which depends from the bearing 21 beneath the friction wheel 31 and the shiftable clutch member 30. One of the parts of the forked arm 54 extends upwardly (see Figs. 2 and 6) and is connected by a link 56 to a crank arm 57 on a transverse rock shaft 58. This shaft is journaled in suitable bearings 59 mounted upon the cross bar 13 and a series of shift levers 60, 61 and 62 are mounted on the outer end of this shaft. These levers are bent forward, as shown, to extend over the friction wheel 36, and the shift lever 60 is fixed to the shaft while the levers 61 and 62 are loosely mounted thereon. By moving the lever 60 the shaft 58 is rocked to thereby shift the arm 54 and move the clutch member 30 to released position against the tension of the spring 51. Each of the shift levers 60, 61 and 62 is provided with a foot-piece 63 pivoted on its end and connected by a link 64 to a dog 65. These dogs are pivoted to the levers and each is arranged to engage the teeth of a series of notched segments 66, formed upon the bearings 59 of the rock shaft. The operator can readily shift the levers 60, 61 and 62 by pressing on the foot-piece 63. By tipping his foot he can at the same time throw the dogs 65 into and out of engagement with the notched segments 66.

The lever 61 is arranged to shift the wheels 36 and 37 axially upon the counter-shaft 38. For this purpose the lever is connected by a link 67 to a crank arm 68 on the upper end of a sleeve 69. This sleeve (see Figs. 6 and 7) is vertically pivoted to a bracket 70 on the side bar 10 of the frame, and is provided at its lower end with an inwardly and downwardly extending arm 71 having a forked inner end embracing the countershaft 38. Links 72 connect the inner forked ends of the arm 71 with a ring 73, which engages an annular groove in the common hub of the friction wheels 36 and 37. A spring 74 extends between the arm 71 and the cross bar 14 and tends to hold the friction wheel 37 in line with its companion wheel 34. By means of the shift lever 61 the arm 71 can be moved against the tension of the spring 74 to move the friction wheel 37 out of line with with the pinion 34 and the friction wheel 36 into line with the pinion 33, as shown in the drawings.

The foot lever 62 is arranged to throw the reversing gear into and out of operation and for that purpose it is connected by a link 75 to a crank arm 76 on the upper end of a sleeve 77. This sleeve is vertically pivoted in a suitable bracket 78 on the side bar 10 of the frame and is provided at its lower end with an inwardly and downwardly extending arm 79. The inner forked end of this arm embraces the sleeve 48 and is pivotally connected to a ring 80 which engages an annular groove in the sleeve. A spring 81 extending between the arm 79 and the cross bar 15 normally holds the reversing gearing in the disengaged position shown. By shifting the lever 61 the arm 79 is moved against the tension of the spring 81 to shift the sleeve 48 and thereby move the friction wheel 45 into line with the friction pinion 42 on the counter-shaft 38, and to move the toothed gear 46 into engagement with the toothed gear 47 on the drive shaft 20. By releasing the foot lever the spring 81 will restore the parts to the normal position.

The boxes 39 and 40 of the counter-shaft are slidably mounted, as stated, upon the cross bars 13 and 14. Each of these boxes is arranged within a suitable guide-way formed between the main body of the cross bar and an overhanging or projecting portion 82 thereof, as shown in Fig. 5. Coiled springs 83 extend between the inner ends of the guide-ways and the boxes and engage studs on these parts to be thereby held in position. These springs tend to shift the counter-shaft away from the motor shaft 27 and drive shaft 20 so that the friction wheels on these shafts will be held out of engagement. The counter-shaft is bodily shifted against the pressure of the springs 83 by a pair of shifter arms 84, (see Fig. 4). The hubs of these arms are mounted on vertical pivot pins 85 at the outer ends of the guide-ways for the journal boxes 39 and 40. These arms are provided at their inner ends with cams 86 which engage the boxes 39 and 40 and these cams are oppositely arranged so that by moving the outer ends of the arms toward each other the counter-shaft 38 will be moved laterally to throw the friction wheels thereon into engagement with the companion friction wheels on the motor shaft and drive shaft.

Each shifter arm 84 is provided at its outer end with a sleeve 87 (see Figs. 4 and 7) rotatable thereon and pivotally connected to the forked end of a link 88. The adjacent ends of these links are pivotally connected to a combined equalizer and shifter bar 89, which is provided with a shifting fulcrum. In the form shown, the bar 89 is pivoted at its point of connection with one of the links 88 to the lower end of a swinging link 90 that is pivoted at its upper end to a bracket 91 on the side bar 10 of the machine frame. The equalizer bar 89 extends above its point of connection with the link 90 and at its upper end has a lost motion or pin and slot connection with the rear end of a link 92, the forward end of which is connected to the shift lever 60. By shifting the lever 60 forwardly beyond the position shown in the drawings, the equalizer bar 89 will be rocked to thereby move the shifter arms 84 through the medium of the links 88 and thereby force the counter-shaft 38 laterally to bring the friction wheels thereon into engagement with the companion friction wheels on the motor and drive shafts. The mechanism is such that the friction wheels can be forced into engagement with the proper amount of pressure to insure an effective driving contact. Moreover, the arrangement of the bar 89 acts to equalize the pressure of the shifter arms upon the opposite ends of the counter-shaft, so that the friction wheels at opposite ends thereof will be in proper contact with the companion friction wheels.

The lever 60 controls both the clutch member 30 that directly connects the motor shaft 27 and drive shaft 20, and is also arranged to throw the speed reducing and reversing gearing on the counter-shaft 38 into and out of operation. The lever 60 is held in its idle position, midway between the ends of its movement, by the engagement of the dog 65 thereon with a deep notch in the companion segment 66. If the lever is released and permitted to move to its innermost position, the spring 51 will force the clutch member 30 into engagement with the friction wheel 31 to thereby directly couple the motor shaft 27 to the drive shaft 20, to thereby drive the machine ahead at full speed. This inward movement of the lever from its mid-position, shown in Fig. 7, will not affect the counter-shaft 38 or the shifting devices therefor, because of the lost motion connection between the lever and the bar 89. As the lever 60 is moved forward from its innermost position it will rock the shaft 58 and thereby, through the medium of the rock arm 57, link 56 and arm 54, will move the clutch member 30 to inoperative position against the tension of the spring 51, so that, when the lever is in its mid-position shown in Fig. 7, both the clutch member and the speed reducing gearing will be in inoperative position. This initial movement of the lever from its innermost position to its mid-position will take up the lost motion between the link 92 and the bar 89 and a further shift of the lever will throw the shaft 38 transversely to bring the friction wheels thereon into operative engagement with the companion friction wheels. If the reverse mechanism is in its normal position, shown in the drawings, the machine will be driven ahead either at slow or at intermediate speeds by the engagement of the friction wheel 41 with the member 31 on the drive shaft 20 and by the engagement of either of the friction wheels 36 or 37 with the companion friction wheel 33 or 34 on the motor shaft. The friction wheels 36 and 37 are shifted to proper position to effect either the slow or intermediate speed by means of the lever 61 before the lever 60 is moved to throw the friction wheels into engagement. This arrangement enables the operator to control the starting of the machine and its speed with a single foot lever.

By moving the foot lever 60 forward from its mid-position shown in the drawings, the speed reducing gearing will be thrown into operation to start the machine ahead at slow speed. When the machine is under way he can release the lever 60 and permit it to return to its innermost position, so that the springs 83 will act to throw the counter shaft and the speed reducing gearing thereon out of operation and the spring 51 will act to throw the clutch member 30 into engagement to directly connect the shafts 20 and 27, so that the machine will then proceed at full speed. If the driver desires to reverse the machine, he will first shift the lever 62 to bring the wheel 45 beneath the friction wheel 42 and the pinion 46 into mesh with the gear 47, before he operates the main controlling lever 60 to throw the counter shaft laterally. In this position of the parts, either one of the friction wheels 36 or 37 can engage its companion friction wheel 33 or 34 on the motor shaft, when the lever 60 is operated to shift the counter shaft 38 transversely, but the friction wheels 42 and 45 at the opposite ends of the counter shaft are of such sizes that they will prevent the engagement of the adjacent wheel 41 with the wheel 31 on the drive shaft. With the reversing mechanism in shifted position, the machine may therefore be driven rearwardly either at slow or intermediate speeds by moving the lever 60 to throw the counter-shaft transversely and thereby bring the wheel 32 thereon into engagement with the wheel 45, and either one of the wheels 36 or 37 into engagement with its companion wheel 33 or 34.

The slightly unequal movement of the rear end of the counter shaft 38 in driving the machine ahead and rearwardly, is permitted by reason of the equalizing connections between the opposite ends of the shaft. To permit the ready engagement of the wheel 45 with the wheel 42 the latter is preferably provided with a beveled outer end, as shown, and to permit the ready engagement with the gears 46 and 47 the teeth are provided with beveled edges.

When the reversing gear 45 is engaged with the friction wheel 42, the counter shaft 38 is not thrown far enough out of parallelism with the shafts 20 and 27 to interfere with the proper frictional engagement of the gears at the opposite ends of the counter shaft. It is only essential that the friction wheels 42 and 45 should be of such size that the friction wheel 41 cannot be forced into driving contact with the frictional wheel 31 by the transverse movement of the counter shaft. Moreover, the material of the friction wheels 33, 34 and 42 is sufficiently yielding to permit the proper engagement of these wheels with their coöperating friction wheels when the reversing gear 45 is opposite the friction wheel 42.

When the machine is operated at high speed, the connection between the motor and the rear driving axle is direct, the only gears in operation being the gearing which connects the transmission shaft 24 to the drive axle. The remainder of the transmission mechanism is idle and there is no strain upon any of these idle parts. The speed reducing and reversing gearing may thus be readily shifted, since there is no strain or pressure thereon, and set for reducing the speed or for reversing the direction of travel, as desired, before the main controlling lever 60 is shifted to throw out the high speed clutch and throw in the speed reducing or reversing gearing. The high speed clutch which directly connects the motor shaft and drive shaft is spring-held in operative position, while the counter shaft and speed reducing and reversing means controlled thereby are normally spring-held out of operative position. The main, common controlling lever acts to successively shift these parts against the tension of the springs when the lever is moved from its innermost to its outermost position and thereby successively throws the high speed clutch out of operation and the speed reducing mechanism into operation. When the lever is reversely shifted the speed reducing mechanism is thrown out of operation by the springs 83 and the spring 51 restores the high speed clutch to operative engagement with the wheel 31.

It should be noted that by shifting the main controlling lever 60 outwardly from its mid-position, the friction, speed reducing gearing may be gradually engaged to start the machine slowly and with progressively increasing speed. Then by slowly returning the controlling lever to its innermost position (and toward which it is spring pressed by the clutch spring 51) the transmission from low speed to high speed may be gradually or progressively effected.

It is obvious that numerous changes may be made in the details set forth without departure from the essentials of the invention.

I claim as my invention:—

1. In a vehicle driving mechanism, the combination with a motor shaft, of a drive shaft in line with said motor shaft, a spring pressed, friction clutch member for directly connecting said shafts, speed reducing, spring pressed friction gearing for connecting said shafts and arranged to compel the rotation of said drive shaft in the same direction as said motor shaft, and a common shift lever and connections operated thereby for shifting said clutch member and said friction gearing against the tension of the springs thereof to thereby alternately throw said clutch and said friction gearing into and out of operation, said parts being arranged to prevent the simultaneous operation of said clutch and said friction gearing, substantially as described.

2. In a vehicle driving mechanism, the combination of a drive shaft, a motor shaft in line with said drive shaft, a friction clutch member for directly connecting said shafts, friction gearing for connecting said shafts, springs for holding said clutch member in operative position and said gearing out of operation, a common shaft lever and connections operated thereby for successively shifting said clutch and said gearing against the tension of said springs to throw said clutch out of operation and said gearing into operation, substantially as described.

3. In a vehicle driving mechanism, the combination of a drive shaft, a motor shaft in line with said drive shaft, a friction clutch for directly connecting said shafts, speed reducing gearing for connecting said shafts independently of said clutch, a shift lever for moving said gearing to different positions, a common shift lever for alternately throwing said clutch and said gearing into and out of operation, reversing gearing arranged to be interposed between said speed reducing gearing and said drive shaft, and a controlling shift lever for said reversing gearing, substantially as described.

4. In a vehicle driving mechanism, the combination of a drive shaft, a motor shaft in line with said drive shaft, a friction clutch member for directly connecting said shafts, friction wheels on said shafts, a parallel counter-shaft having coöperating friction wheels thereon, said counter-shaft being transversely movable to throw said wheels into and out of engagement, and shift mechanism for said clutch member and said counter shaft arranged to prevent the simultaneous operation of said clutch member and said friction wheels, substantially as described.

5. In a vehicle driving mechanism, the combination with a motor shaft, of a drive shaft in line with said motor shaft, a clutch for directly connecting said shafts, friction wheels on said shafts, a parallel counter-shaft, coöperating friction wheels thereon, shifters engaging the ends of said counter-shafts for throwing said wheels into and out of engagement, and means for operating said shifters and for equalizing the pressure between the same, substantially as described.

6. In a vehicle driving mechanism, the combination, of a drive shaft, a motor shaft in line with said drive shaft, a friction clutch member for directly connecting said shafts, friction wheels on said shafts, a parallel counter-shaft having coöperating friction wheels thereon, said counter-shaft being transversely shiftable for throwing said friction wheels into and out of operation, springs for holding said counter-shaft in inoperative position, a spring for holding said clutch member in engaged position, and a common shift mechanism for successively disengaging said clutch and throwing said counter-shaft to operative position, substantially as described.

7. In a vehicle driving mechanism, the combination, of a drive shaft, a motor shaft in line with said drive shaft, a clutch for directly connecting said shafts, friction wheels on said shafts, a parallel counter-shaft having coöperating friction wheels thereon, reversing gearing aranged to be interposed between said counter-shaft and said drive shaft, and means for shifting said counter-shaft transversely to throw said friction wheels and said reversing gearing into and out of operation, substantially as described.

8. In vehicle driving mechanism, the combination of a drive shaft, a motor shaft in line with said drive shaft, a shiftable clutch member for directly connecting said shafts, a parallel, transversely shiftable counter-shaft, a pair of coöperating friction wheels on said counter and said motor shafts, a second pair of coöperating friction wheels on said counter and said drive shafts, and reversing gearing adapted to be interposed between said counter shaft and said drive shaft and arranged, in operative position, to hold said second pair of friction wheels out of engagement, substantially as described.

9. In vehicle driving mechanism, the combination of a drive shaft, a motor shaft in line with said drive shaft, a shiftable clutch member for directly connecting said shafts, a parallel, transversely shiftable counter-shaft, a pair of coöperating friction wheels on said counter and said motor shafts, a second pair of coöperating friction wheels on said counter and said drive shafts, springs engaging the ends of said shaft to hold said friction wheels out of engagement, shifters engaging the ends of said shaft for throwing said wheels into engagement, and means for operating said shifters and for equalizing the pressure between the same, substantially as described.

10. In a vehicle driving mechanism, the combination of a drive shaft, a motor shaft in line with said drive shaft, a shiftable clutch member for directly connecting said shafts a parallel, transversely shiftable counter-shaft, a pair of coöperating friction wheels on said counter and said motor shafts, a second pair of coöperating friction wheels on said counter and said drive shafts, springs engaging the ends of said shaft to hold said friction wheels out of engagement, shifters engaging the ends of said shaft for throwing said wheels into engagement, connections for operating said shifters and for equalizing the pressure between the same, and reversing gearing adapted to be interposed between one end of said counter-shaft and said drive shaft and arranged, in operative position, to hold said second pair of friction wheels out of engagement, substantially as described.

11. In a vehicle driving mechanism, the combination of a drive shaft, a motor shaft in line with said drive shaft, a parallel transversely shiftable counter-shaft, pairs of coöperating friction wheels for connecting said counter-shaft to said motor and said drive shafts, springs engaging the ends of said counter shaft to hold said wheels out of engagement, pivoted shifter arms engaging the ends of said counter-shaft to throw said friction wheels into engagement, an equalizer bar connected at its opposite ends to said shifter arms, a pivoted fulcrum link for said equalizer bar and a controlling lever connected to said equalizer bar, substantially as described.

12. In a vehicle driving mechanism, the combination with a motor shaft, of a drive shaft in line with said motor shaft, a parallel, transversely shiftable counter-shaft, coöperating pairs of friction wheels on said shafts, shifters engaging the ends of said counter-shaft to throw said friction wheels into and out of engagement, an equalizer bar connected at its opposite ends to said shifters, and a controlling shifter connected to said equalizer bar, substantially as described.

13. In a vehicle driving mechanism, the combination with a motor shaft, of a drive shaft in line with said motor shaft, a friction clutch member for directly connecting said shafts, a parallel, transversely shiftable counter-shaft, friction wheels of different diameters on said motor shaft, two coöperating wheels on said counter-shaft, a shifter moving one of said sets of wheels axially to bring either into line with its companion wheel, a pair of coöperating friction wheels on said counter-shaft and said drive shaft, and a common shifter and connections operated thereby for alternately throwing said clutch member and said counter-shaft into and out of operative position, substantially as described.

14. In a vehicle driving mechanism, the combination of a drive shaft, a motor shaft in line with said drive shaft, a shiftable friction clutch member for directly connecting said shafts, speed reducing and reversing friction gearing for connecting said shafts independently of said clutch member, means for shifting said friction gearing to vary the speed, means for reversing said friction gearing, and a common shifter for said gearing and said clutch member arranged to throw either into and the other out of operation, substantially as described.

EDWARD M. HEYLMAN.

Witnesses:
F. H. FARNSWORTH,
W. F. BOSWORTH.

---

Copies of this patent may be obtained for five cents each, by addressing the "Commissioner of Patents, Washington, D. C."